United States Patent
Kelley et al.

(10) Patent No.: US 6,869,708 B2
(45) Date of Patent: Mar. 22, 2005

(54) MEANS FOR MEASURING THE LIQUID LEVEL IN A RESERVOIR FOR A FUEL CELL

(75) Inventors: Ronald J. Kelley, Coral Springs, FL (US); Sivakumar Muthuswamy, Plantation, FL (US); Steven D. Pratt, Plantation, FL (US); Robert W. Pennisi, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/621,199

(22) Filed: Jul. 16, 2003

(65) Prior Publication Data

US 2004/0005496 A1 Jan. 8, 2004

Related U.S. Application Data

(62) Division of application No. 09/906,266, filed on Jul. 16, 2001.

(51) Int. Cl.[7] .............................................. H01M 8/04
(52) U.S. Cl. ............................. 429/23; 429/90; 429/91; 429/92; 429/22
(58) Field of Search ............................. 429/23, 22, 90, 429/91, 92

(56) References Cited

U.S. PATENT DOCUMENTS

| | | | |
|---|---|---|---|
| 4,194,395 A | | 3/1980 | Wood |
| 4,629,664 A | * | 12/1986 | Tsukui et al. ................. 429/23 |
| 4,977,786 A | * | 12/1990 | Davis ....................... 73/864.24 |
| 5,111,201 A | * | 5/1992 | Matsumura et al. ... 340/870.38 |
| 5,677,944 A | * | 10/1997 | Yamamoto et al. ......... 455/573 |
| 5,759,712 A | | 6/1998 | Hockaday |
| 6,268,077 B1 | | 7/2001 | Kelley et al. |
| 6,307,605 B1 | | 10/2001 | Bailey |
| 6,314,307 B1 | | 11/2001 | Charron |
| 6,323,097 B1 | * | 11/2001 | Wu et al. ................... 438/384 |
| 6,326,097 B1 | | 12/2001 | Hockaday |
| 6,374,187 B1 | * | 4/2002 | Knight et al. ................. 702/51 |
| 6,405,062 B1 | | 6/2002 | Izaki |
| 6,740,432 B1 | * | 5/2004 | Shimanuki et al. ........... 429/13 |

* cited by examiner

Primary Examiner—Bruce F. Bell
(74) Attorney, Agent, or Firm—Randi L. Karpinia

(57) ABSTRACT

A small fuel cell (10) powers a portable electronic device (12) and contains a fuel reservoir (14) and a device (16) that measures the amount of liquid fuel (18) that is in the reservoir. The fuel cell operates on hydrogen that is obtained from a liquid hydrocarbon fuel, such as alcohol or other hydrocarbons. The liquid fuel is typically converted into hydrogen by a reforming process. The reservoir that is connected to the fuel cell has an indicia (19) that is readable by a human user of the portable electronic device, for measuring the amount of liquid hydrocarbon fuel that is present in the reservoir. Typically, the indicia consist of a sight glass, a capacitive element, a resistive element, a transparent portion of the reservoir, a float, or an acoustic transmitter coupled with an acoustic receiver.

3 Claims, 1 Drawing Sheet

US 6,869,708 B2

MEANS FOR MEASURING THE LIQUID LEVEL IN A RESERVOIR FOR A FUEL CELL

CROSS REFERENCE TO RELATED APPLICATIONS

This application is a divisional of pending U.S. application Ser. No. 09/906,266, filed Jul. 16, 2001, and assigned to Motorola, Inc.

TECHNICAL FIELD

The present invention is related to systems for measuring and indicating the level and/or quantity of liquid fuel in a container or storage tank of a fuel cell.

BACKGROUND

In recent years, nearly all electronic devices have been reduced in size and made lightweight, in particular portable electronic devices such as cellular telephones, two-way radios, laptop computers, personal digital assistants (PDAs), etc. This advancement has been made possible, in part, by the development of new battery chemistries such as nickel-metal hydride, lithium ion, zinc-air, and lithium polymer that enable larger amounts of power to be packaged in a smaller container. These secondary or rechargeable batteries need to be recharged upon depletion of their electrical capacity. This is typically performed by connecting the battery to a battery charger that converts alternating current to a low level direct current of 2–12 volts. The charging cycle typically lasts a minimum of 1–2 hours, and more commonly 4–14 hours. Although the new batteries are a tremendous advancement over the previous generations of batteries, they still suffer from the need for sophisticated charging regimens and the slow charging rates. Some have sought to replace electrolytic batteries with fuel cells. Simply put, fuel cells catalyticly convert a hydrogen molecule to hydrogen ions and electrons, and then extract the electrons through a membrane as electrical power, while oxidizing the hydrogen ions to $H_2O$ and extracting the byproduct water. The tremendous advantage of fuel cells is the potential ability to provide significantly larger amounts of power in a small package, as compared to a battery. However, the problem of how to replenish the supply of hydrogen fuel to the spent fuel cell still seeks an elegant and practical solution before widespread consumer acceptance occurs. Some have sought to use methanol as the source of hydrogen, by catalyticly converting or 'reforming' the methanol using exotic schemes or in the direct methanol fuel cell. Methanol is more attractive to consumers than gaseous hydrogen, as it is more readily available and can be more easily stored and contained. However, the methanol still needs to be replenished from time to time, and it would be desirable if the user of a small methanol-powered fuel cell could easily and readily determine how much longer the fuel cell will operate until the fuel supply is exhausted. In other words, to measure how much liquid methanol remains in the storage container.

BRIEF DESCRIPTION OF THE DRAWINGS

The sole drawing FIGURE is an isometric drawing of an electronic device powered by a fuel cell having visually readable indicia in accordance with one embodiment of the invention.

DETAILED DESCRIPTION OF THE PREFERRED EMBODIMENT

Figure 1:
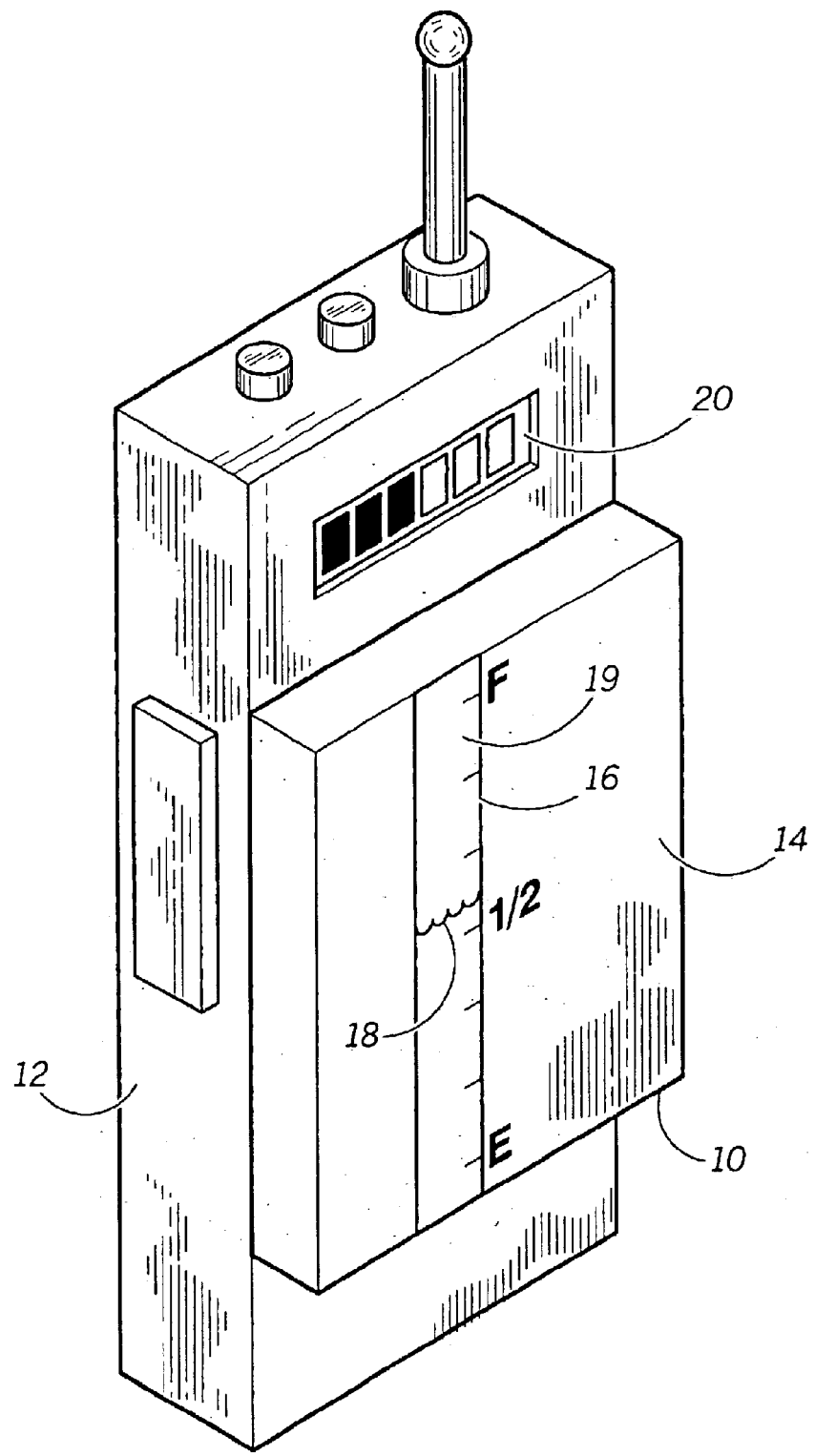

While the specification concludes with claims defining the features of the invention that are regarded as novel, it is believed that the invention will be better understood from a consideration of the following description in conjunction with the drawing figures, in which like reference numerals are carried forward. Referring now to the drawing figure, a small fuel cell 10 that can be used to power a portable electronic device 12 has incorporated therewith a fuel reservoir 14 that has a means for measuring 16 the amount of liquid fuel 18 that is in the reservoir. The fuel cell operates on hydrogen that is obtained from a liquid hydrocarbon fuel, such as alcohol or other hydrocarbons. The liquid fuel is typically converted into hydrogen by a reforming process. The reservoir that is connected to the fuel cell has an indicia 19 that is readable by a human user of the portable electronic device, for measuring the amount of liquid hydrocarbon fuel that is present in the reservoir. Typically, the indicia 19 consist of a sight glass, a capacitive element, a resistive element, a transparent portion of the reservoir, a float, or an acoustic transmitter coupled with an acoustic receiver. In an alternate embodiment, the level of liquid fuel in the fuel cell is communicated to the user of the electronic device by a display 20, such as a liquid crystal display (LCD) or a series of light emitting diodes (LED) that are appropriately connected to a sensor on or in the reservoir. The display 20 can be conveniently located on either the electronic device or on the fuel cell or on the fuel cell reservoir.

Many techniques have been developed to measure the liquid levels and liquid quantities in storage tanks. One system for measuring the fuel level in the fuel tank of a motor vehicle employs a variable resistor within the tank. The wiper arm of the variable resistor is connected through a pivot to a float which monitors the upper level of the fuel in the tank. Other systems use immersion capacitor units or probes in liquid containers or tanks in combination with suitable electrical circuitry and measuring and indicating instrumentation, where the liquid itself forms the dielectric between the plates. The capacitive value of the immersion capacitor is variable and changes with respect to the level of liquid in the container. By constructing the capacitor unit of multiple pairs of plates which are placed in different areas of the container, the effects of liquid sloshing or surging and liquid level shift are reduced, so as to obtain an accurate capacitance value for the immersion unit. The immersion capacitor unit (whether of single pair or multiple pair plate design) is electrically connected into a bridge circuit having two condensers of fixed and equal capacity, each forming an arm of the bridge, the remaining two arms of the bridge being made up of a variable capacitor and the immersion capacitor. The bridge circuit (of well known Wheatstone configuration) is connected to a source of alternating current of predetermined frequency and detector and measurement indicating circuitry. The bridge circuitry is arranged to be in an unbalanced state so long as any liquid remains in the container in the dielectric space between the plates of the immersion capacitor unit.

In U.S. Pat. No. 4,194,395 granted to T. J. Wood, entitled "Capacitive Liquid Level Sensor," a capacitive type sensor for measuring liquid levels has a plurality of like plate-type capacitors arranged in parallel. The dielectric spaces of each capacitor (isolated from each other) receive the liquid to be measured which (with air, if any, above the liquid) establishes the dielectric for the spaces and thus the capacitance value of each capacitor. Since the capacitors are identically configured they exhibit equal values of capacitance only when the liquid dielectric (and air, if any) between the plates of each capacitor covers equal areas. When the liquid within a container is being measured as to its height level or volume and is sloshing or has its level disoriented with respect to its normal liquid level reference plane, the liquid (functioning as a dielectric) covers different areas of the capacitors and they exhibit dissimilar values of capacitance. Associated circuitry interrogates the capacitors and at points when the capacitance values approach equality the system reads one of the values and registers the liquid level or quantity of liquid remaining in the container. These types of systems overcome the problems of fuel level shift, sloshing, or orientation of the reservoir while measuring the amount of liquid in the reservoir or tank.

Another embodiment of the invention utilizes a sight glass to visually determine the amount of fuel in the reservoir. As depicted in FIG. 1, the reservoir 14 can have the sight glass 16 incorporated as an integral part of the container, i.e. as a transparent portion of the container 14. This can be accomplished, for example, by making the reservoir 14 from plastic and making the sight glass 16 from clear plastic. The user then looks at the sight glass and corresponds the level of fuel to a scale or indicia 19 that is part of the sight glass or is inscribed on the reservoir. Another visual technique finds the entire fuel reservoir made of a transparent or translucent material so as to make the fuel level easily seen from any angle. A colorant can be optionally added to the fuel in any of the visual techniques to assist in determining the fuel level.

Still another embodiment measures the level of fuel in the reservoir by measuring an electrical resistance through the fuel in the reservoir. This is accomplished via conductive elements placed at opposing ends of the reservoir. The conductive elements are used to measure the resistance across the fuel, whereby higher levels of fuel would result in lower resistance readings. The resistance readings are then cross referenced to a lookup table which provides the corresponding fuel level, which is communicated to the user via a display, speech message, light emitting diode gauge, or other common means.

A further embodiment of the invention utilizes acoustic signals. The signals are transmitted in the fuel reservoir, the signals are detected by a detector appropriately located in the reservoir, a response is measured by the detector, the measurement is compared to a lookup table, and a corresponding fuel level is determined and communicated to the user via a display, speech message, light emitting diode gauge, or other common means. Alternatively, a speaker can be used to generate a sine wave signal while the electrical resistance of the speaker coil is measured. Depending on the level of fuel in the reservoir and the corresponding air space above the fuel, the force required by the speaker to move the air in the space above the fuel would result in a given electrical resistance and hence the fuel level can be determined. Yet another embodiment of the acoustic measuring method bounces an acoustic signal off the top surface of the fuel to measure the fuel level by determining the distance from the top of the container to the fuel surface. The distance can be measured by calculating the time delay between the transmission of the signal from the top of the reservoir towards the fuel surface and receipt of the reflected signal back at the top of the reservoir.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. For example, an additional liquid level measuring means, similar to those espoused above, can be incorporated and used to measure the amount of water in a second reservoir, when water is held in the second reservoir and used to dilute the methanol.

What is claimed is:

1. A fuel cell system for a portable electronic device, comprising:
    a fuel cell capable of operating on hydrogen that is obtained from methanol;
    a reservoir for storing a supply of methanol, suitably connected to the fuel cell, wherein a fuel quantity measuring means is located within the reservoir, wherein the fuel quantity measuring means comprises:
        an acoustic transmitter for transmitting an acoustic signal within the reservoir, and
        an acoustic receiver for receiving the acoustic signal, wherein the fuel quantity measuring means is adapted to:
            measure a response at the acoustic receiver, and
            cross reference the measured response to a lookup table which provides the corresponding fuel level.

2. A fuel cell system for a portable electronic device, comprising:
    a fuel cell that operates on hydrogen obtained from a liquid hydrocarbon fuel; and
    a reservoir for containing a supply of the liquid hydrocarbon fuel, said reservoir connected to the fuel cell, wherein a sensing means for measuring the amount of liquid hydrocarbon fuel that is present is located within the reservoir, wherein the sensing means comprises:
        an acoustic transmitter for transmitting an acoustic signal within the reservoir, and
        an acoustic receiver for receiving the acoustic signal, wherein the sensing means is adapted to:
            measure a response at the acoustic receiver, and
            cross reference the measured response to a lookup table which provides the corresponding fuel level.

3. The fuel cell system as recited in claim 2, further comprising an indicia readable by a human user of the portable electronic device, wherein the indicia comprises a display for displaying the fuel level.

* * * * *